(12) United States Patent
Poli et al.

(10) Patent No.: US 9,497,419 B2
(45) Date of Patent: Nov. 15, 2016

(54) METHOD AND APPARATUS FOR DELIVERING PROGRAMMING CODE OBJECTS TO SET-TOP TERMINALS AND THE LIKE

(75) Inventors: Christopher Poli, Doylestown, PA (US); Lawrence D. Vince, Lansdale, PA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 424 days.

(21) Appl. No.: 11/769,012

(22) Filed: Jun. 27, 2007

(65) Prior Publication Data

US 2009/0007215 A1 Jan. 1, 2009

(51) Int. Cl.

| | |
|---|---|
| *H04N 7/16* | (2011.01) |
| *H04N 7/173* | (2011.01) |
| *H04N 21/262* | (2011.01) |
| *H04N 21/433* | (2011.01) |
| *H04N 21/4425* | (2011.01) |
| *H04N 21/81* | (2011.01) |

(52) U.S. Cl.
CPC .... *H04N 7/17318* (2013.01); *H04N 21/26291* (2013.01); *H04N 21/4331* (2013.01); *H04N 21/4425* (2013.01); *H04N 21/818* (2013.01); *H04N 21/8173* (2013.01)

(58) Field of Classification Search
CPC .................. H04N 21/26291; H04N 21/4331; H04N 21/4425; H04N 21/8173; H04N 21/818; H04N 7/17318
See application file for complete search history.

(56) References Cited

U.S. PATENT DOCUMENTS

| | | | | |
|---|---|---|---|---|
| 6,098,106 A | * | 8/2000 | Philyaw et al. | 709/238 |
| 6,505,160 B1 | * | 1/2003 | Levy et al. | 704/270 |
| 6,813,778 B1 | | 11/2004 | Poli et al. | |
| 7,290,257 B2 | * | 10/2007 | Henig et al. | 717/176 |
| 7,785,204 B2 | * | 8/2010 | Wells et al. | 463/42 |
| 2004/0040043 A1 | * | 2/2004 | Heo | 725/134 |
| 2004/0210941 A1 | | 10/2004 | Poli et al. | |
| 2005/0091699 A1 | * | 4/2005 | Poli et al. | 725/132 |
| 2005/0114900 A1 | | 5/2005 | Ladd et al. | |
| 2005/0275758 A1 | * | 12/2005 | McEvilly et al. | 348/725 |
| 2006/0020950 A1 | | 1/2006 | Ladd et al. | |
| 2006/0218604 A1 | | 9/2006 | Riedl et al. | |
| 2006/0225097 A1 | | 10/2006 | Lawrence-Apfelbaum | |
| 2006/0259924 A1 | | 11/2006 | Boortz | |
| 2006/0271977 A1 | * | 11/2006 | Lerman et al. | 725/88 |

(Continued)

OTHER PUBLICATIONS

Official Action, RE: Canadian Application No. 2,691,532, dated Sep. 12, 2012.
PCT Search Report & Written Opinion, RE: Application No. PCT/US2008/067838; dated Oct. 22, 2008.

*Primary Examiner* — Rong Le
(74) *Attorney, Agent, or Firm* — Stewart M. Wiener

(57) ABSTRACT

A set top box is provided that includes an RF front-end for receiving programming content over a distribution communication network. A processor is operatively associated with the RF front-end and a storage device is operatively associated with the processor. An interface is provided for establishing communication with an external device. In response to a signal received from the distribution network over the RF front-front identifying at least one programming object to be downloaded thereto, the processor is configured to locate and receive the programming object from the external device through the interface.

17 Claims, 4 Drawing Sheets

(56) References Cited

U.S. PATENT DOCUMENTS

| | | |
|---|---|---|
| 2006/0294512 A1 | 12/2006 | Seiden |
| 2007/0050836 A1 | 3/2007 | Stanek et al. |
| 2007/0061394 A1* | 3/2007 | Frid-Nielsen et al. ....... 709/202 |
| 2007/0083936 A1 | 4/2007 | Booth et al. |
| 2008/0209492 A1* | 8/2008 | Matsuura et al. ............ 725/117 |
| 2008/0301744 A1* | 12/2008 | Hutchings .................... 725/110 |

* cited by examiner

METHOD AND APPARATUS FOR DELIVERING PROGRAMMING CODE OBJECTS TO SET-TOP TERMINALS AND THE LIKE

FIELD OF THE INVENTION

The present invention relates generally to software objects downloaded over a distribution network such as an HFC or IP network to a client device such as a set-top terminal used to receive broadcast and other multimedia.

BACKGROUND OF THE INVENTION

In a typical cable television system, subscribers are provided with a set-top terminal that is used to connect the subscriber's television, and potentially other electronic equipment, with the cable network.

The set-top terminal is usually connected to the cable network through a co-axial wall outlet. The set-top terminal is essentially a computer that is programmed to process the signals from the cable network so as to provide the subscriber with the cable services. These services from the cable television company typically include access to a number of television channels and, perhaps, an electronic programming guide (EPG). Additional premium channels may also be provided to subscribers for an additional fee. Pay-per-view events and video-on-demand service may also be provided over the cable network. The set-top terminal is programmed to provide these services to the subscriber.

However, the services of the cable company need not be limited to providing television programming. Some cable companies are now offering internet access and e-mail service over their cable networks at speeds much faster than are available over conventional telephone lines. It is anticipated in the future that more and more services will be provided over the cable network. Eventually, each home or office may have a single connection, via the cable network, to all electronic data services.

As the cable network and the services provided evolve, the set-top terminal must also evolve so as to be able to provide subscribers with all the services available from the cable network that are of interest to those subscribers. This set-top terminal evolution will primarily involve changes to the programming of the set-top terminal. By upgrading the software or firmware of the set-top terminal, the terminal can be made to perform more efficiently or offer new services as the cable network evolves.

In order to upgrade the population of set-top terminals on a cable network, it is preferable to transmit the new programming to the set-top terminals via the cable network itself. Otherwise, a technician must visit each subscriber to upgrade or re-program that subscriber's set-top terminal. Such field upgrades would obviously be at significant expense.

The headend is the facility from which the cable network operator broadcasts television signals and provides other services over the cable network. Updated software that is provided to the population of set-top terminals is broadcast from the headend over the cable network. The software or firmware objects are typically sent in an object carousel, which provides pieces of the object that can be put together at the terminal to form the complete object. Depending on the bandwidth dedicated to a particular object and the size of the object, the time it takes to broadcast the complete object can vary. The headend may also broadcast messages or instructions over the cable network to the set-top terminals.

As used herein, a programming code object, or code object, refers to an individual program, i.e. a piece of software or firmware, that can be downloaded to and executed by a set-top terminal. One example of a code object is an application object. As used herein, the term "application" refers generally to a unit of executable software that implements theme-based functionality The themes of applications vary broadly across any number of disciplines and functions (such as e-commerce transactions, brokerage transactions, mortgage interest calculation, home entertainment, calculator etc.), and one application may have more than one theme. Another type of object is a data object, which refers to any data structure, including a code object, message or instruction, that is transmitted by the headend over the cable network to one or more set-top terminals.

Before a set top terminal is installed and operational on the subscriber premises it must undergo at least two initialization processes. The first initialization phase occurs when the set top terminal manufacturer provides the set top terminal to the service provider (e.g., an MSO). At this time the set top terminals are warehoused prior to shipment to the subscriber premises. During this phase of initialization the set top terminal needs to be provisioned with minimal functionality. This is a time-consuming and expensive process because each set top terminal must be individually connected to a facility that downloads the necessary objects. This is a labor and shipping intensive process since the set top terminals cannot be directly shipped to subscriber but rather need to be warehoused for the purposes of initialization.

The second and final phase of initialization occurs on the subscriber premises when the set top terminal needs to be provisioned with additional end-user functionality after it is in communication with the headend over the cable network. That is, the objects needed to provide this additional functionality are downloaded by the field technician after establishing communication between the set-top terminal and the network. This process can require up to 20 minutes or more during which field technician is idle, which translates into a waste of time as well as resources and money. Moreover, this time will likely increase as the services offered by set-top terminals continues to grow, thereby increasing the number and size of the objects that need to be downloaded.

Another problem involving the downloading of objects to a set top terminal arises after the set top terminal is in deployed and operational on the subscriber premises and needs to be upgraded. Upgrading may be necessary for a multitude of reasons. For example, software patches and the like may be needed correct problems with software that is currently being used on the set top terminal. In addition, as noted, set-top terminals are increasingly being used to provide subscribers with more and more services that offer richer functionality. These services often require additional objects to be downloaded to the set-top terminals, which consumes an increasing amount of network resources (e.g., bandwidth) and require additional time to complete. A single terminal may require several objects of each type to provide the complete set of services offered by the cable or service provider. During the upgrade process some or all of the functionality of the set top terminal may be unavailable to the subscriber, thus potentially disrupting service to the subscriber. For example, during upgrading, while the subscriber may still be able to view programming, access to certain functions such as the electronic program guide (EPG) or on-demand services, for instance, may be curtailed. In some cases it may even be necessary to curtail all service for a limited period of time while objects are being downloaded.

Thus, in summary, the downloading of objects during the initialization process, both before and after installation of the set top terminal on the subscriber premises, as well as during subsequent upgrades, presents numerous problems that result in expenditures of time and money and which adversely impact the subscriber's ability to view programming.

DETAILED DESCRIPTION

As detailed below, a method and apparatus is provided to eliminate the costly pre-loading of code objects onto set-top terminals or other equipment that are intended to provide a variety of services. These techniques also significantly reduce the provisioning time that an installer needs to complete the installation of the equipment when additional objects codes are needed which would otherwise be delivered over a network. Moreover, the download time required to deliver the code to upgrade significant populations of equipment such as set-top terminals can be significantly reduced by pre-positioning code so that it is locally available to portions of the client population. These techniques may be used during both or either phase of the initialization process to reduce the amount of technician time needed and to save time and money associated with shipping the set top terminals. They may also be used when upgrades are provided to the set top terminals to minimize disruption of service to the subscriber.

Figure 1:
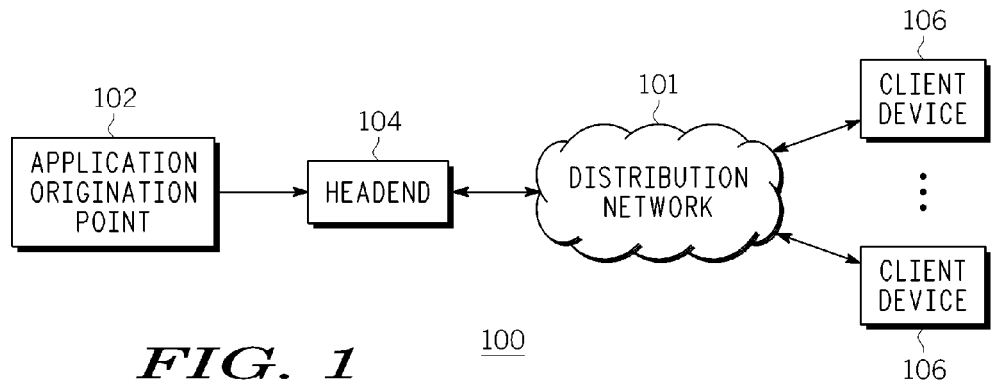
FIG. 1 shows a system architecture for delivering content to a subscriber.

FIG. 1 shows a system architecture 100 for delivering content to a subscriber. The various components of the system 100 include (i) one or more application object origination points 102; (ii) headend 104; (iii) distribution network 101; and (iv) client devices 106. The headend 104 and client devices 106 are connected via the distribution (e.g., HFC or IP) network 101.

The client devices 106 includes any equipment in the customer or subscriber premises that can be accessed by a headend 104. Such client devices 106 comprise processors and associated computer memory adapted to store and run the downloaded objects. One example of a client device is a set-top terminal. In the present context, objects are typically downloaded to the client device, which then executes or otherwise uses the downloaded objects. Objects may be (i) "pushed" to the client device (i.e., wherein the headend causes the application download to occur), (ii) "pulled" to the client device (i.e., where the client device causes the download), (iii) downloaded as the result of some third entity or device (such as a remote server); or (iv) combinations of the foregoing.

Distribution Network 101 is a point-to-point network that distributes signals to all or a subset of the subscribers in the system. Distribution Network 101 may comprise an edge QAM modulator and a hybrid fiber-coax (HFC) network, for example. The edge modulator receives Ethernet frames that encapsulate transport packets, de-capsulate these frames and remove network jitter, implements modulation and, performs frequency up-conversion and transmits radio frequency signals representative of the transport stream packets to end users over the HFC network. In the HFC network, the transport stream is distributed from the headend (central office) to a number of second level facilities (distribution hubs). Each hub in turn distributes carriers to a number of fiber nodes. In a typical arrangement, the distribution medium from the head-end down to the fiber node level is optical fibers. Subscriber homes are connected to fiber hubs via coaxial cables. Instead of using an edge modulator and an HFC network, distribution network 101 may alternatively comprise, for example, a packet-switched network that is capable of delivering IP packets directly to the client devices 106 using, for example, a cable data network, PON, or the like.

The application object origination point 102 may be used to provide the headend 104 with third party application objects (e.g., game applications, e-commerce applications, etc.) that are to be downloaded to the client devices 106. Other application objects such as EPG and VOD applications may originate at the headend 104 since they are often provided directly by the network system operator. The application object origination point 102 comprises any medium that allows an application to be transferred to the headend 104. This can include for example an application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

Figure 2:
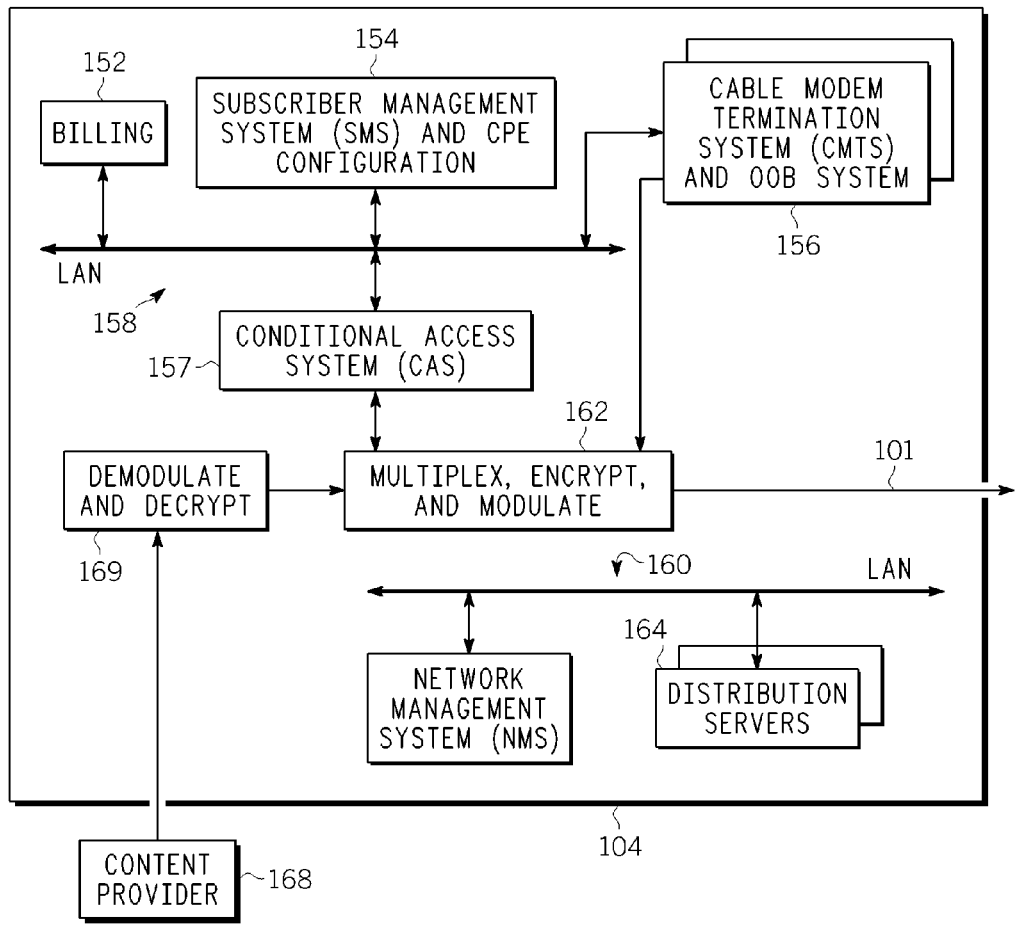
FIG. 2 shows one example of a network headend architecture.

Referring now to FIG. 2, one illustrative embodiment of the network headend. As shown, the head-end architecture 150 comprises typical head-end components and services including billing module 152, subscriber management system (SMS) and client device configuration management module 154, cable-modem termination system (CMTS) and (out-of-band) OOB system 156, as well as LAN(s) 158 and 160 for placing the various components in data communication with one another. It will be appreciated that while a bar or bus LAN topology is illustrated, any number of other arrangements (e.g., ring, star, etc.) may be used. The head-end receives content from a content provider 168. The content is received by a demodulator and decryptor 169 in the headend. Distribution servers 164, which are coupled to the LAN 160, store the objects that are to be downloaded to the client devices 106.

The architecture 150 of FIG. 2 further includes a multi-plexer/encrypter/modulator (MEM) 162 coupled to the HFC network 101 (via a conditional access system 157) and the demodulator and decryptor 169. The MEM 162 is adapted to "condition" content for transmission over the distribution network 101. In a typical distribution network, information is carried across multiple channels. Thus, the head-end must be adapted to acquire the information for the carried channels from various sources. Typically, the channels being delivered from the headend 104 to the client device 106 ("downstream") are multiplexed together in the headend and sent to neighborhood hubs (not shown). It will also be appreciated that the head-end configuration depicted in FIG. 2 is a high-level, conceptual architecture and that each network may have multiple head-ends deployed using different architectures.

Figure 3:
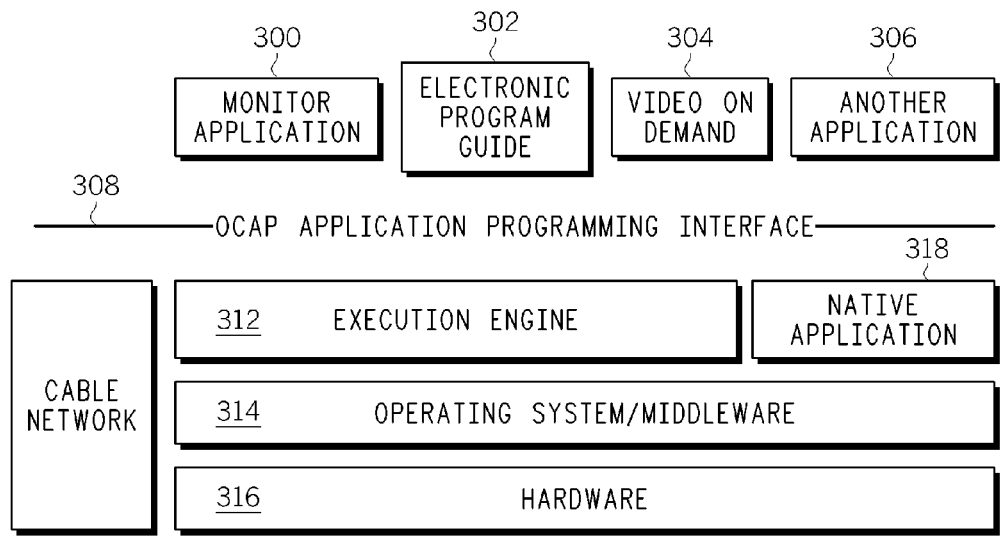
FIG. 3 shows the logical architecture of a set top terminal that serves as one of the client devices depicted in FIG. 1

FIG. 3 shows the logical architecture of one particular example of client device 106. In this example the client device 106 is illustrated as a set-top terminal that is compliant with the OpenCable Application Platform (OCAP) hardware and software environment. The OCAP specification is a middleware software layer specification intended to enable the developers of interactive television services and applications to design such products so that they will run successfully on any cable television system, independent of set-top or television receiver hardware or operating system software choices. As is well known, middleware generally comprises one or more layers of software which are positioned "between" application programs and the lower or physical layers of the network device. Middleware is commonly written for the specific requirements of the operator of the computer system, and the proprietary software purchased by the operator of the computer system. A key role of middleware is to insulate the application programs from the device specific details. By using middleware the application programmers need know very little about the actual network details, since they can rely on the middleware to address the complexities of interfacing with the network. Of course, the client device 106 is not limited to an OCAP-compliant software/hardware architecture. In other cases, for example, the client devices 106 may be compliant with MHEG, DASE or Multimedia Home Platform (MHP) middleware. Alternatively, the client devices 106 may be based on a proprietary architecture.

Referring to FIG. 3, the top of an OCAP software "stack" includes a Monitor Application 300, Electronic Program Guide (EPG) 302, Video-on-Demand Application 304, and any other applications 306 that may be deployed in a particular network. These applications are run on top of a software layer called the "Execution Engine" 312 and interface to the Execution Engine using the well known OCAP APIs 308. The client device may also include certain software applications or "Native Applications" 318 that do not run within the Execution Engine, but directly run on top of the Operating System/Middleware 314 for the client device. Native Applications are typically written for, e.g., a particular hardware configuration 316 of the client device 106. Examples of such Native Applications may include management of front panel functionality, remote control interaction, games, and the like. The objects downloaded to the client device in accordance with the techniques described herein may include any of the aforementioned applications and programs as well as additional applications, programs or other objects. However, during an upgrade many of the objects that need to downloaded may be directed to applications located above the OCAP application programming interface 308.

Figure 4:
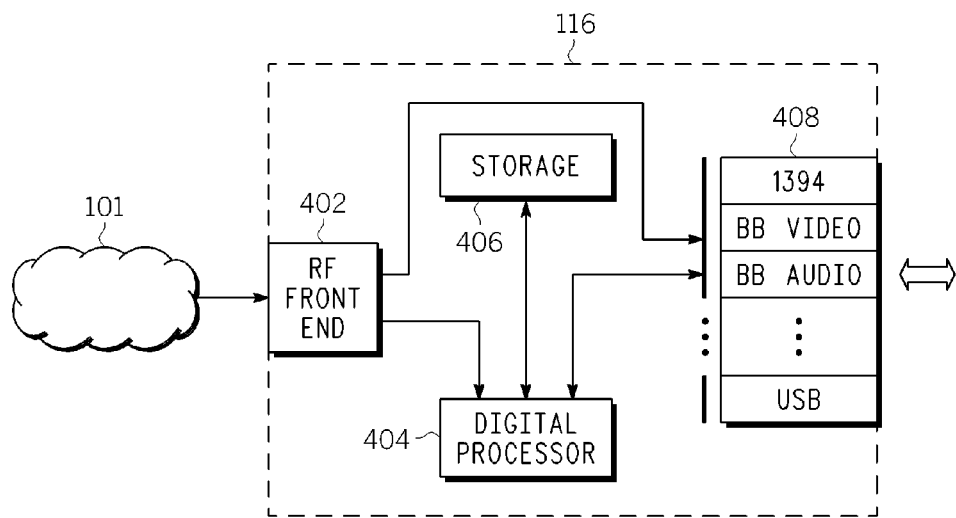
FIG. 4 shows one example of the hardware employed by the client device depicted in FIG. 3.

FIG. 4 shows one example of the client device hardware 116. The device hardware 116 generally includes an RF front end 402 (including modulator/demodulator) for interfacing with the distribution network 101 of FIG. 1, digital processor(s) 404, storage device 406, and a plurality of interfaces 408 (e.g., video/audio interfaces, IEEE-1394 "Firewire", USB, serial/parallel ports, etc.) for establishing communication with other end-user devices such as televisions, personal electronics, computers, WiFi or other network hubs/routers, etc. Other components which may be utilized within the device include RF tuner and decoder stages, various processing layers (e.g., DOCSIS MAC, OOB channels, MPEG, etc.) as well as media processors and other specialized SoC or ASIC devices. These additional components and functionality are well known to those of ordinary skill in the art and accordingly are not described further herein.

Referring once again to FIG. 1, content (e.g., audio, video, etc.) is provided to the client devices 106 over the distribution network 101 in downstream (in-band) channels. To communicate with the head-end, the client device 106 may use out-of-band (OOB) or DOCSIS channels or an IP tunnel or an IP connection and associated protocols. To distribute files, applications and other programs to the client devices 106, the files and applications are configured as objects that may be sent in the in-band and/or the OOB channels. The objects reside on distribution server 164 (see FIG. 2) and may be transferred to the client devices 106 using a data carousel. As is well known in the art, a carousel may be viewed as a repository of objects which repeatedly transmits the various components of a particular object. The object components of the carousel utilized herein are sent in a continuous round-robin fashion. If the client device misses a desired or necessary object in one carousel transmission, it can wait for the next. The full complement of objects may be sent on a number of object carousels that are appropriately identified through an object signaling mechanism appropriate for the given system.

The data carousel may use any of a variety of techniques and protocols to download the objects to the client devices. For example, an object may be configured as part of the program content on a given in-band (e.g., FAT channel) or DOCSIS channel or Out of Band channel and transmitted in a broadcast or on-demand fashion. In one particular example in which MPEG is used as the transport layer protocol, an object is carried in its own elementary stream with an assigned PID. As yet another embodiment, the object is downloaded directly in the form of IP (Internet Protocol) packets in an IP channel using an appropriate protocol such as TFTP or the like. The object download process may be initiated by way of a query from the client device 106, or alternatively a signal generated by the headend 104.

Prior to downloading one or more objects, a control message may be sent by the headend to the set-top terminal (It should be noted that while the term set-top terminal will often be used in the following for purposes of illustration, in all cases the concepts and techniques are more generally applicable to a variety of client devices and not just set-top terminals). The control message itself can be sent in an OOB channel, an in-band channel or over an IP connection or IP tunnel. The control message identifies the location of the object or objects to be downloaded. If, for example, the object is downloaded in-band on an MPEG transport stream, the identifier may include the frequency of the transport stream carrying the object, its modulation mode and PID. In an OCAP environment, if available in the Code Version Table (CVT), the identifier may include the Source_id, through which the frequency of the transport stream carrying the object, its modulation mode and PID can be obtained. Of course, alternative techniques, including proprietary techniques, may be employed to identify the object carousel (e.g., by identifying a channel on which the object is available).

As previously mentioned, when a set-top terminal or other client device is initially installed on a premises, various applications and other objects need to be downloaded to it from the headend. These objects are downloaded after the installer establishes communication between the set-top terminal and the distribution network. Once connected, the set-top terminal will typically undergo an initialization process during which initialization parameters need to be downloaded before any additional activity can commence. These initialization parameters may include the control message described above, which lists the objects to be downloaded along with their location on the network. To conserve various resources, including the amount of time the installer must be on the premises, instead of downloading the objects over the distribution network, the set-top terminal may be configured to first determine if the objects are alternatively available from a source other than the distribution network itself, and preferably from a source that can transfer the objects to the client device in much less time. Such alternative sources may include a removable storage medium that the installer brings to the premises when installing the set-top terminal. For example, the removable storage medium may be, without limitation, a magnetic disk drive, floppy disk drive, tape drive, flash memory card, memory stick, or an optical disk drive such as a compact disk ROM device (CD-ROM), CD recordable drive (CD-R Drive), CD rewritable drive (CD-RW Drive) or a digital versatile disk ROM drive (DVD-ROM).

The aforementioned removable storage devices generally include a specialized connector for coupling to a computing device such as a set-top terminal or other client device. For this purpose the set-top terminal will have an appropriate interface (e.g., interface 408 in FIG. 4), such as a personal computer memory card international association (PCMCIA) interface including a 16 bit standard PC Card interface and a 32 bit standard CardBus interface, a Universal Serial Bus (USB) interface, a Universal Serial Bus 2 (USB2) interface, a future generation USB interface, an IEEE 1394 FireWire interface, a Small Computer System Interface (SCSI) interface, an Advance Technology Attachment (ATA) interface, a serial ATA interface, an Integrated Device Electronic (IDE) interface, an Enhanced Integrated Device Electronic (EIDE) interface, a Peripheral Component Interconnect (PCI) interface, a PCI Express interface, a conventional serial or parallel interface, or another interface that facilitates attachment to the set-top terminal.

If the set-top terminal determines that the objects to be downloaded are in fact available from a removable storage device instead of the distribution network, the set-top terminal will proceed to download the objects from it. Not only can this conserve network resources, it can also substantially reduce the time needed to download the objects. For instance, for purposes of comparison if three application objects are distributed by a carousel at the headend at a rate of 100 kbps, and the object size is such that an object carousel repeats every 80 second andif on average the objects enter the carousel at the midpoint, the total time to download each object will be about 80+40 seconds=120 seconds. Thus, the three applications, which only contain 3 MB of information, will take about 6 minutes to download. Most significantly, if a software upgrade is being performed, during the six minutes some or all of the subscriber's service may be impacted while the objects are downloaded. On the other hand, if the objects are instead available from a removable storage medium such as a flash memory, in many cases this download time can be reduced to well under 1 minute, thus substantially reducing the amount of time during which the subscriber's service will be disrupted when an upgrade is being performed.

When installing a set-top terminal, the amount of time needed to download the objects required to provide typical functionality to the set-top terminal may currently be about 10 to fifteen minutes. This is a significant amount of time during which the field technician is idle, thus translating into a waste of time as well as resources and money. Moreover, this time will likely increase as the services offered by set-top terminals continues to grow, thereby increasing the number and size of the objects that need to be downloaded. By using a local storage medium much or even most of the loss arising from this idle time can be recovered.

The local storage medium on which the objects may be stored or pre-positioned is not limited to the aforementioned removable storage media. More generally, the set-top terminal can be adapted to receive the objects from any available storage medium on which the objects have been pre-positioned by the distribution network. That is, the objects first may be transferred by the carousel over the distribution network in the usual manner. However, the objects downloaded in this manner may be accepted by a local storage medium instead of by the set-top terminal. The objects may be placed in a predetermined directory on the local storage medium. A control or other message may be included with the downloaded objects indicating the storage medium and directory to which the objects are to be pre-positioned. Alternatively, the message may include a url or other locator that can be used by the set top terminal to find the objects to be downloaded. In some cases this message may be included in a separate object that includes a list of all the objects that are to be pre-positioned and their respective locations at which they are available. Alternatively, the storage medium itself may be configured to recognize, access and download the required objects. In this way there is no need to modify the legacy messaging protocols used by headend.

At some subsequent time after the objects have been pre-positioned on the storage medium, the set-top terminal will receive a message from the headend over the distribution network instructing the set-top terminal to activate the downloaded object or objects (e.g., the headend may inform the set-top terminal that an upgrade is needed). At this time the set-top terminal will attempt to locate the downloaded objects by first examining the predetermined directory or directories in the local storage media. If available, the set-top terminal will download the objects from the appropriate storage medium so that they may be executed by the set-top terminal. If the objects are not available from a local storage medium, the set-top terminal will obtain them from the distribution network in the usual manner.

In some cases the storage medium on which the objects are pre-positioned may be incorporated in a device that provides functionality in addition to data storage. For example, the storage medium may be a hard drive that is located in a PC, DVR, media center, handheld device, networked appliance and the like. In addition, instead of transferring the objects directly from the storage medium to the set-top terminal, the objects may be transferred from the storage medium to the set-top terminal over a network such as a LAN, for example.

Figure 5:
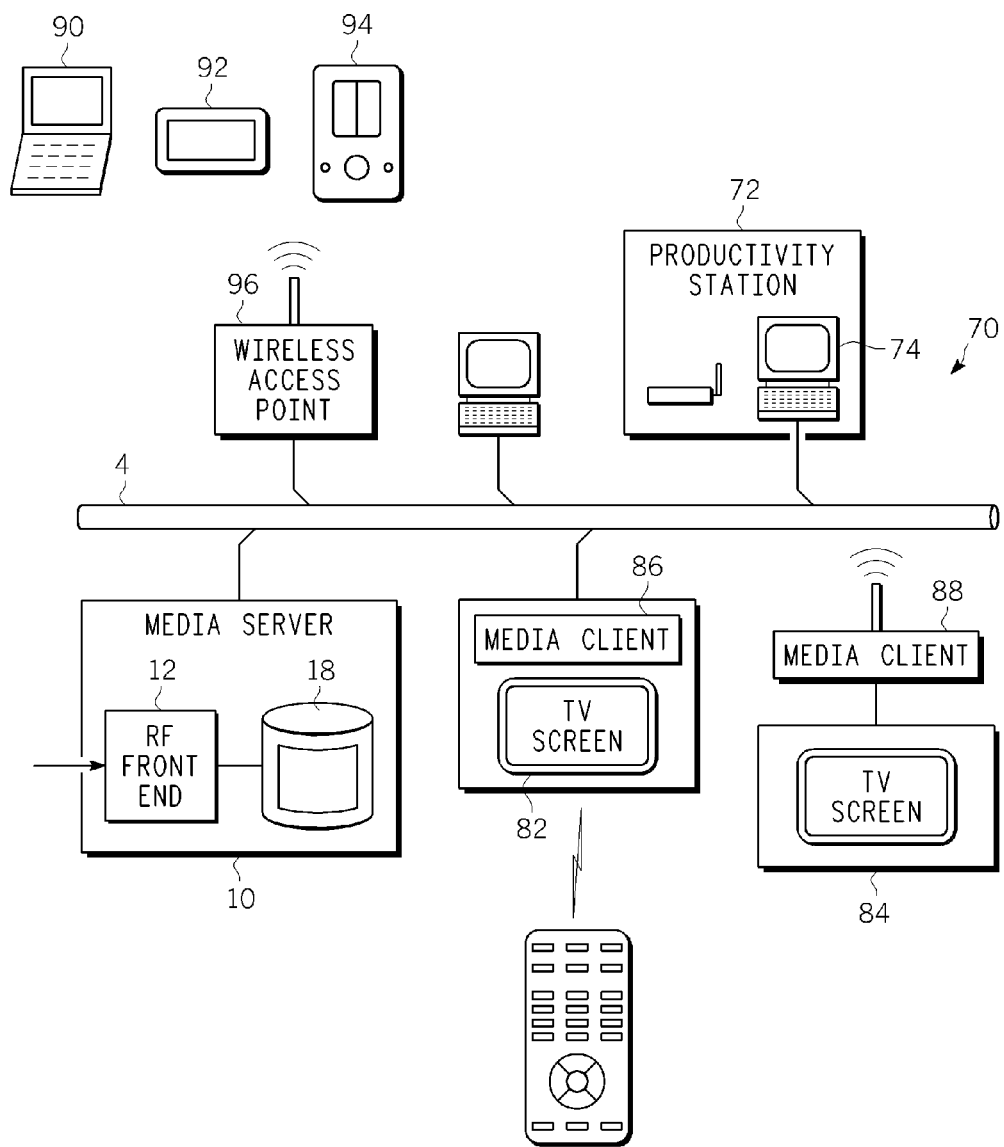
FIG. 5 is a block diagram illustrating an example of a local area network (LAN) over which a client device receives pre-positioned objects from a networked local storage device.

FIG. 5 is a block diagram illustrating an example of an operating environment in which a client device, such as the client devices 106 in FIG. 1, receives pre-positioned objects from a networked local storage device. While for convenience network 70 is referred to as a home network, network 70 more generally may be situated on any premises such as an office, a building, an outdoor venue and the like. The home network 70 may be built on a communications infrastructure 4 (e.g., a LAN) that may employ any suitable suite of communication protocols (e.g. IP-based Ethernet, MOCA, powerline based systems). In the example illustrated in FIG. 5, the home network 70 connects devices for work and entertainment. For instance, a productivity station 72, which may be located in the study room of the house, includes a desktop personal computer 74 that may be connected to the home network via wired or wireless connections. An entertainment center 76, which may be located in the family room, contains video/audio equipment including a display device (e.g., television) 82. The display device 82 has a client device 86 (e.g., a set top box) that provides connectivity to the home network 70. Another display device 84, which may be located in the bedroom, is also connected to the home network 70 by a client device 88. In some examples the home network 70 is a wired network, a wireless network or part wireless and part wireless network. To that end, the home network 70 includes one (or more) wireless access points (WAP) 96 that functions as the base station for a wireless local area network (LAN) and is typically plugged into an Ethernet hub or server. In addition to providing connectivity to the aforementioned devices, a wireless LAN may be especially suitable for portable devices such as a notebook computer 90, a tablet PC 92, and a PDA 94, for example.

The home network 70 includes a media center or server 10, which in this example serves as the local storage medium on which objects may be pre-positioned. The media server may be located, for instance, in an equipment room. The media server 10 may be implemented as a general-purpose computer. Alternatively, the media server 10 may be a dedicated microprocessor-based device, similar to a set-top terminal, with adequate hardware and software implementing media service related functions. The media server 10 includes an RF front-end 12 to communicate with the distribution network 101 and possibly other remote networks. The media server 10 may offer, for instance, digital video, audio, and high speed-data services along with streaming media, PPV, Internet services, video-on-demand, HDTV, and personal video recorder (PVR) capabilities. Moreover, the media server may be associated with, or provide the functionality of, any one or more of the following: a television, a tuner, a receiver, a set-top terminal, and/or a Digital Video Recorder (DVR). The media server may comprise one or many devices, each of which may have fewer or more components than described herein.

The media server 10 includes a storage device 18 that may serve as the local storage medium to which objects are downloaded by the distribution network. At some later time the various client devices (e.g., media clients 86 and 88) can access the objects from the media server upon initiation of a specified event, such as the receipt of an activation message from the headend, for example, or upon its own initiative by sending a pull request to the media server 10.

In some embodiments, instead of pre-positioning the objects on a removable or local storage device as described above, the headend may download the objects to an independent network that can be dedicated to the delivery of objects to client devices. This independent network can deliver the objects to the client device in accordance with any suitable file transfer model. For example, the objects may be transferred over the independent network to the client device (or to a local storage medium) using a client-server model. In some cases the independent network may be a part of a Content Delivery Network (CDN), which is a network of geographically distributed content delivery nodes that are arranged for efficient delivery of content (e.g., programming objects) on behalf of third party providers (e.g., cable network operators). A content delivery network comprises a set of content delivery servers (CDSs) dispersed across the Internet, as well as a domain name server (DNS) infrastructure, which is used to route requests to the nearest CDS. A CDN can be advantageous because it transfers the burden of downloading the objects from the distribution network to a third party network.

Another file transfer model that may be used to deliver the objects to the client device is a peer-to-peer content sharing model, in which one or more users that have previously downloaded a file can share the file with other users. Among other benefits, peer-to-peer distribution models exploit the underutilized upstream bandwidth of existing users. That is, peer-to-peer content sharing models can reduce the costs associated with delivering objects to the client device because they leverage the available upstream bandwidth of multiple clients. In this way the bandwidth costs that would otherwise be associated with a centralized download server are greatly reduced. Current examples of peer-to-peer networks include systems such as BitTorrent, Kazaa, eDonkey, Gnutella, Direct Connect and the like. In some embodiments, a peer to peer file transfer model may be used to transfer objects from one terminal to another terminal that are both connected to the same over a home LAN and which both require the same object(s).

Figure 6:
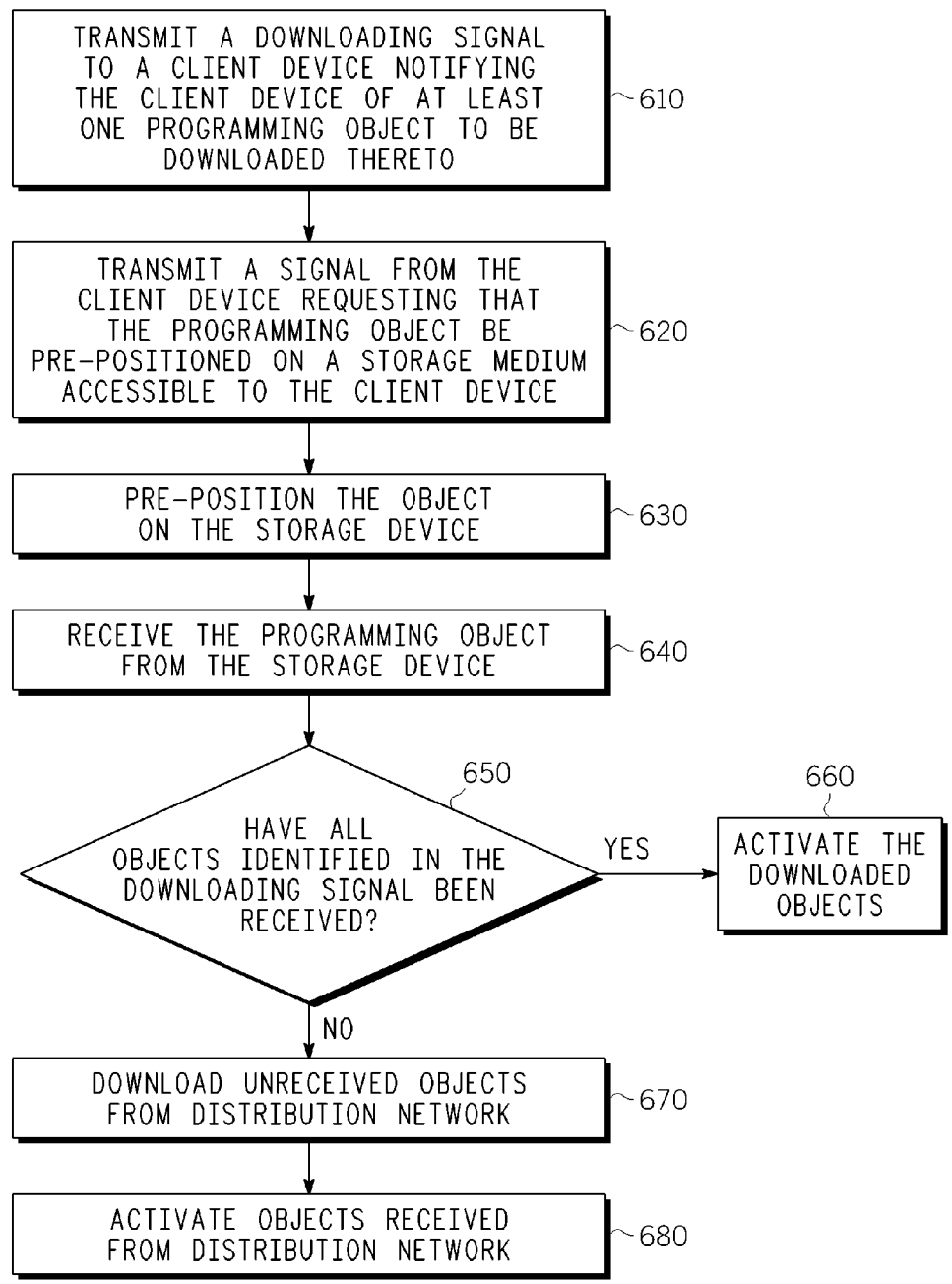
FIG. 6 shows one example of a method that may be employed to install a programming code object or objects on a client device such as a set top terminal.

FIG. 6 shows one example of a method that may be employed to install a programming code object or objects on a client device such as a set top terminal. The method begins in step 610 in which the head end transmits a downloading signal to a client device or a class of such devices over the distribution network. The downloading signal notifies the client device or devices that at least one programming object is to be downloaded thereto. The downloading signal includes an identification of the object to be downloaded. In response to the receipt of the downloading signal, the client device sends a signal back to the headend in step 620 requesting that the programming object be pre-positioned on a storage medium accessible to the client device. As previously mentioned, the storage medium may be a removable or other storage device that is local to the client device, or alternatively, accessible to the client device over a network that is distinct from the distribution network. In step 630 the programming object is pre-positioned on the storage device and in step 640 the client device receives the programming object from the storage device. In step 650 the client device determines if all the objects identified in the downloading signal have in fact been received. If so, then the process continues with step 660, in which the programming objects that have been downloaded are activated by set top terminal, possibly, but not necessarily, upon receipt of a subsequent triggering signal from the headend. If in step 650 one or more objects have not been received from the storage medium, then in step 670 the client device downloads the object or objects over the distribution network and activates them in step 680. Of course, in some cases the objects that have been downloaded may be activated even before the remaining objects have been received from the distribution network. Likewise, not all downloaded objects are necessarily activated at the same time. Rather, they may be activated when needed, desired, or instructed to be activated by a signal from the headend.

The processes described above, including those shown in FIG. 6, may be implemented in a general, multi-purpose or single purpose processor. Such a processor will execute instructions, either at the assembly, compiled or machine-level, to perform that process. Those instructions can be written by one of ordinary skill in the art following the description of FIG. 6 and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

Although various embodiments and examples are specifically illustrated and described herein, it will be appreciated that modifications and variations are covered by the above teachings and are within the purview of the appended claims.

The invention claimed is:

1. At least one non-transitory computer-readable medium comprising stored instructions which, when executed by one or more processors of a client device communicatively coupled to a distribution network and to a local network, causes the one or more processors to perform steps comprising:
   in the client device, causing pre-positioning of a programming object on a storage medium by sending a request signal from the client device to the distribution network, the request signal for requesting that the programming object be pre-positioned on the storage medium rather than be sent over the distribution network to the client device, wherein the storage medium is accessible by the client device without use of the distribution network, and wherein the local network is configured such that the storage medium is accessible via the distribution network for pre-positioning;
   receiving a downloading signal via the distribution network, the downloading signal for notifying at least one client device that at least one programming object is to be downloaded thereto, the downloading signal including an identification of the programming object to be downloaded;
   in response to receipt of the downloading signal:
      determining that the programming object has previously been, in advance of receiving the downloading signal for the client device to download the programming object, pre-positioned on the storage medium; and
      causing the client device to receive the programming object from the storage medium on which the object has been pre-positioned rather than causing the client device to receive the programming object over the distribution network; and
      determining whether the programming object identified in the downloading signal has in fact been received from the storage medium, and if not, causing the client device to receive the programming object over the distribution network; and
   activating the object at a time after its receipt by the client device.

2. The at least one non-transitory computer-readable medium of claim 1 wherein the at least one client device comprises at least one class of set top terminals.

3. The at least one non-transitory computer-readable medium of claim 1 wherein the object is pre-positioned on the storage medium by the distribution network.

4. The at least one non-transitory computer-readable medium of claim 1 wherein at least a plurality of programming objects are to be downloaded, at least one of the programming objects being a data object that identifies at least one additional programming object that is to be subsequently downloaded.

5. The at least one non-transitory computer-readable medium of claim 4 wherein the data object includes a url identifying a location at which the additional programming object is available.

6. The at least one non-transitory computer-readable medium of claim 1 wherein the identification of the object to be downloaded is selected from the group consisting of an object name and an object version.

7. The at least one non-transitory computer-readable medium of claim 1 wherein the identification of the object to be downloaded includes an identification of a source from which the object is to be downloaded to the storage medium.

8. The at least one non-transitory computer-readable medium of claim 1 wherein the identification of the object to be downloaded includes an identification of a transmission stream in which the object is to be downloaded to the storage medium.

9. The at least one non-transitory computer-readable medium of claim 1 wherein the object is received directly from the storage medium over a connector selected from the group consisting of a personal computer memory card international association (PCMCIA) interface, a Universal Serial Bus (USB) interface, an IEEE 1394 FireWire interface, a Small Computer System Interface (SCSI) interface, an Advance Technology Attachment (ATA) interface, a serial ATA interface, an Integrated Device Electronic (IDE) interface, an Enhanced Integrated Device Electronic (EIDE) interface, a Peripheral Component Interconnect (PCI) interface, a PCI Express interface, and a serial or parallel interface.

10. The at least one non-transitory computer-readable medium of claim 1 wherein the downloading signal triggers a search to locate the object on the storage medium.

11. The at least one non-transitory computer-readable medium of claim 1 wherein the downloading signal triggers the activation of the object.

12. The at least one non-transitory computer-readable medium of claim 1 wherein at least a plurality of programming objects are to be downloaded and a first of the programming objects is unavailable on the storage medium and further comprising downloading the first programming object over the distribution network.

13. The at least one non-transitory computer-readable medium of claim 1 wherein activation of the object includes execution of a software platform, operating system or application.

14. A set top terminal which is communicatively coupled to a distribution communication network, comprising:
   an RF front-end for receiving programming content over the distribution communication network;
   a processor operatively associated with the RF front-end;
   a storage device operatively associated with the processor;
   an interface for establishing communication with an external device associated with the set top terminal; and
   wherein, in response to a first signal received from the distribution network over the RF front-end, the first signal including an identification of at least one programming object to be downloaded to the set top terminal, the processor determines that the programming object is located on the external device and receives the programming object from the external device through the interface, wherein the programming object has been, in advance of receiving the first signal for the set top terminal to download the programming object, pre-positioned on the external device, the pre-positioning comprising:
  sending a second signal from the set top terminal back to the distribution network, the second signal for requesting that the programming object be pre-positioned on a storage medium of the external device rather than be sent over the distribution network to the set top terminal, wherein the external device is accessible by the set top terminal without use of the distribution network, and wherein the external device is configured such that the storage medium is accessible via the distribution network for pre-positioning;
wherein the processor determines whether the programming object identified in the downloading signal has in fact been received from the external device, and if not, causes the client device to receive the programming object over the distribution network; and
wherein the processor activates the object at a time after its receipt by the set top terminal.

15. The set top terminal of claim 14 further comprising executable code located on the storage device for facilitating operations performed by the processor and wherein the programming object includes an update to the executable code.

16. The set top terminal of claim 14 wherein the programming object is an application object.

17. The set top terminal of claim 14 wherein the programming object is compliant with the OpenCable Application Platform (OCAP).

* * * * *